United States Patent
Mercier et al.

(10) Patent No.: US 10,940,492 B2
(45) Date of Patent: Mar. 9, 2021

(54) THIMBLE FOR CYCLONE SEPARATOR

(71) Applicant: FOSBEL WAHL HOLDINGS, LLC, Brook Park, OH (US)

(72) Inventors: Gilles Mercier, Brentwood, TN (US); Stephen D. Cherico, Westlake, OH (US); Timothy A. Upp, Toledo, OH (US)

(73) Assignee: FOSBEL WAHL HOLDINGS, LLC, Brook Park, OH (US)

( * ) Notice: Subject to any disclaimer, the term of this patent is extended or adjusted under 35 U.S.C. 154(b) by 61 days.

(21) Appl. No.: 16/402,489

(22) Filed: May 3, 2019

(65) Prior Publication Data
US 2019/0255538 A1    Aug. 22, 2019

Related U.S. Application Data

(63) Continuation-in-part of application No. 15/209,229, filed on Jul. 13, 2016, now Pat. No. 10,328,439.

(51) Int. Cl.
*A47L 5/36* (2006.01)
*B04C 5/13* (2006.01)
(Continued)

(52) U.S. Cl.
CPC ............ *B04C 5/13* (2013.01); *B01D 21/0087* (2013.01); *B01D 45/16* (2013.01); *B04C 5/081* (2013.01); *F16B 2/065* (2013.01); *F16M 13/022* (2013.01); *F27B 7/2016* (2013.01); *F16B 47/00* (2013.01); *F16B 2001/0035* (2013.01);
(Continued)

(58) Field of Classification Search
CPC ...... B04C 5/13; B01D 45/16; B01D 21/0087; F16B 2/065; F16B 2001/0035; F16B 47/00; F16B 2200/50; F16B 2200/503; F16B 2200/506; F27B 7/20; F27B 7/2016; F16M 13/022; F16M 13/02
See application file for complete search history.

(56) References Cited

U.S. PATENT DOCUMENTS

| 1,844,369 A | 2/1932 | Ross et al. |
| 3,273,320 A | 9/1966 | Joseph et al. |

(Continued)

FOREIGN PATENT DOCUMENTS

EP    0024148 B1    2/1981

OTHER PUBLICATIONS

Flsmidth A/S, "One Source, Preheater calciner system", 2011, pp. 1-8.

*Primary Examiner* — Dung H Bui
(74) *Attorney, Agent, or Firm* — Nixon & Vanderhye P.C

(57) ABSTRACT

A thimble assembly for a cyclone separator comprising a plurality of mounting brackets separately mountable on a shelf of the separator along the perimeter of an exhaust opening, a plurality of segments vertically successively suspended from the brackets, the segments of an upper row being joined to the brackets, the segments of each successive lower row being joined to the segments of a row immediately above, each bracket exclusively serving a chord of an arc concentric with the preferably circular opening that is substantially the same in length as the chord of an arc that a segment spans, a center-to-center chordal spacing of adjacent brackets being the same as a center-to-center distance of an adjacent pair of segments.

21 Claims, 8 Drawing Sheets

(51) Int. Cl.
  *B04C 5/081* (2006.01)
  *B01D 21/00* (2006.01)
  *F16B 2/06* (2006.01)
  *F16M 13/02* (2006.01)
  *F27B 7/20* (2006.01)
  *B01D 45/16* (2006.01)
  *F16B 1/00* (2006.01)
  *F16B 47/00* (2006.01)

(52) U.S. Cl.
  CPC ..... *F16B 2200/50* (2018.08); *F16B 2200/503* (2018.08); *F16B 2200/506* (2018.08); *F16M 13/02* (2013.01)

(56) References Cited

U.S. PATENT DOCUMENTS

| | | |
|---|---|---|
| 3,470,678 A | 10/1969 | Clark et al. |
| 4,505,051 A | 3/1985 | Herchenbach et al. |
| 4,651,783 A | 3/1987 | Christiansen |
| 4,961,761 A | 10/1990 | Johnson |
| 5,417,932 A | 5/1995 | Castagnos, Jr. et al. |
| 5,441,081 A | 8/1995 | Maury |
| 5,853,443 A * | 12/1998 | Rodgers ................ B01D 45/08 55/456 |
| 6,024,874 A | 2/2000 | Lott |
| 6,214,075 B1 | 4/2001 | Filges et al. |
| 6,517,597 B2 | 2/2003 | Filges et al. |
| 6,837,913 B2 * | 1/2005 | Schilling ................ B04C 5/13 138/107 |
| 7,736,409 B2 | 6/2010 | Rowley, Jr. et al. |
| 7,841,477 B2 | 11/2010 | Hansen |
| 8,728,190 B2 | 5/2014 | Werchowski et al. |
| 8,882,873 B2 * | 11/2014 | Brownlee ............. B01D 45/16 55/459.1 |
| 9,791,096 B2 * | 10/2017 | Mahoney ............... F16B 33/002 |
| 2003/0188519 A1 | 10/2003 | Schilling et al. |
| 2012/0204526 A1 | 8/2012 | Brownlee |
| 2012/0324847 A1 | 12/2012 | Dupree et al. |
| 2014/0078859 A1 * | 3/2014 | Lundberg ................ F15D 1/001 366/337 |
| 2016/0363259 A1 * | 12/2016 | Ma ....................... G06F 1/1601 |

* cited by examiner

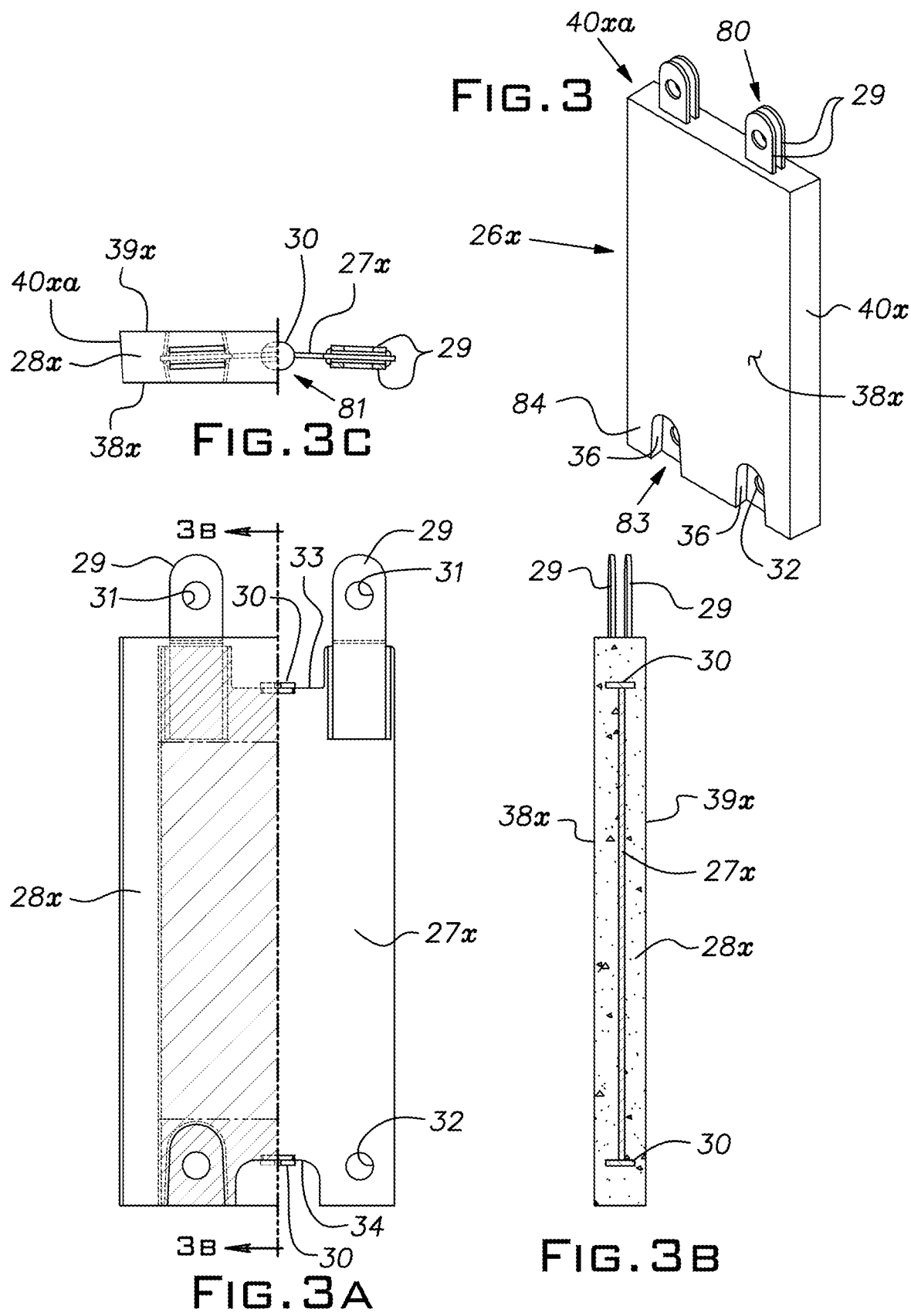

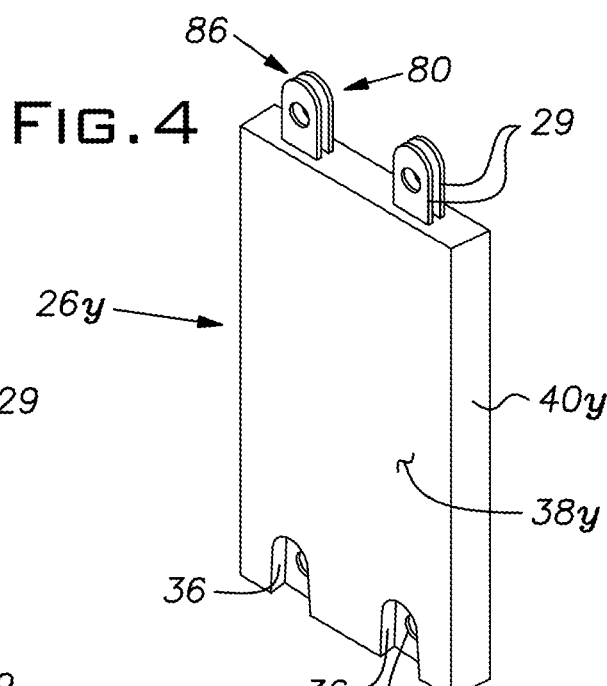
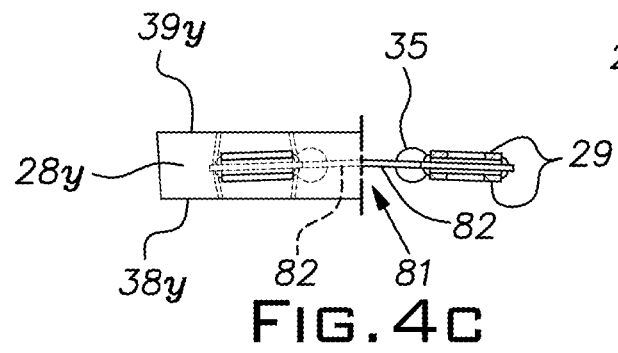
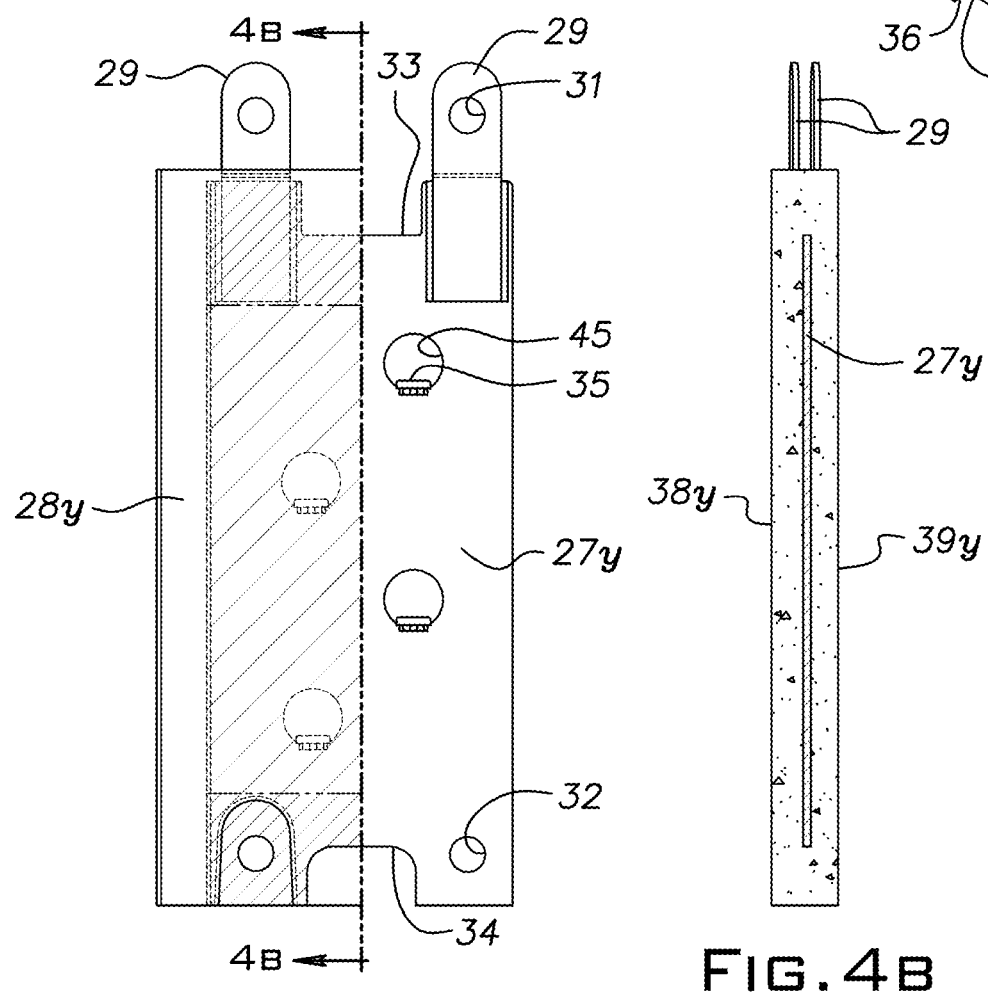

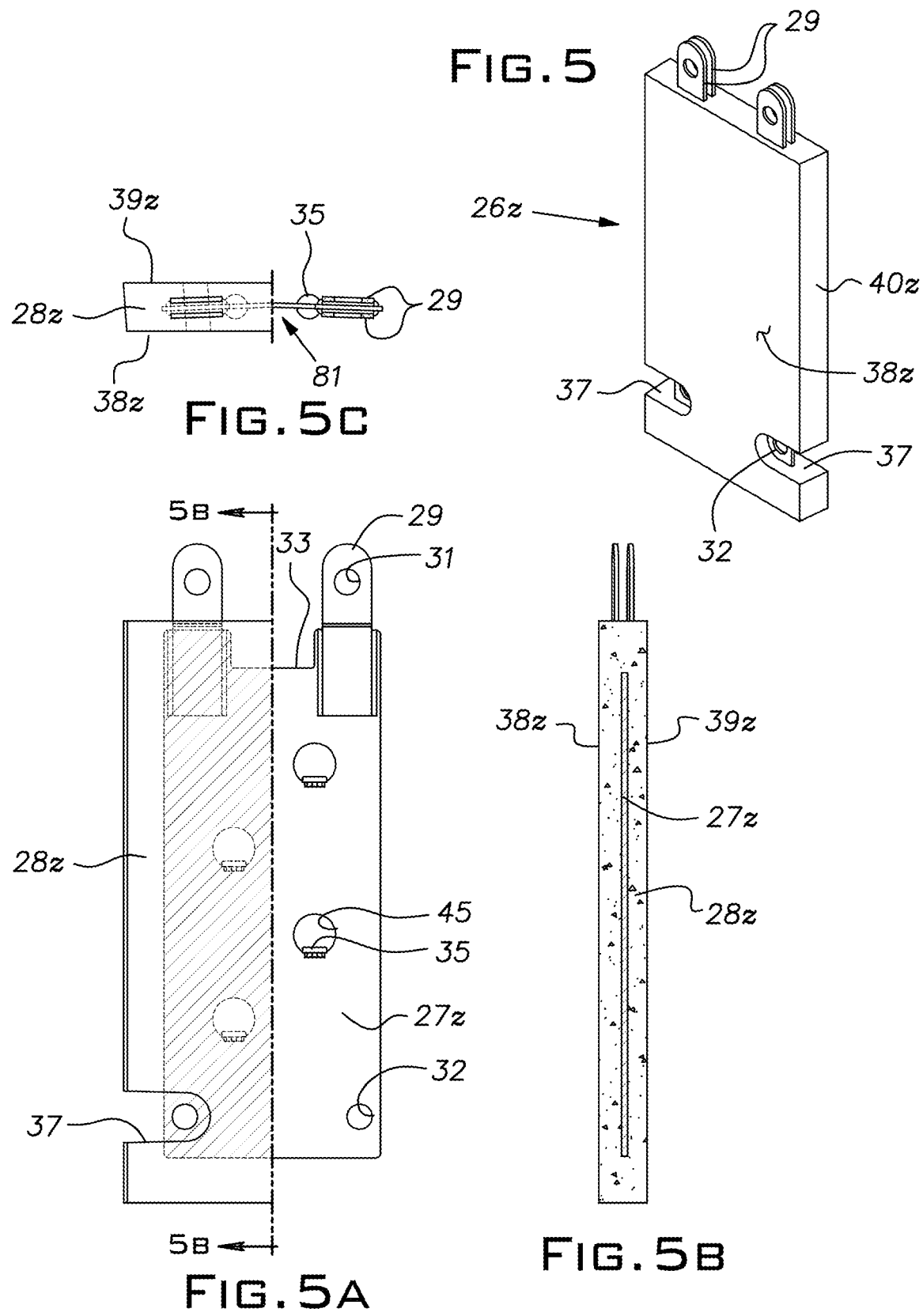

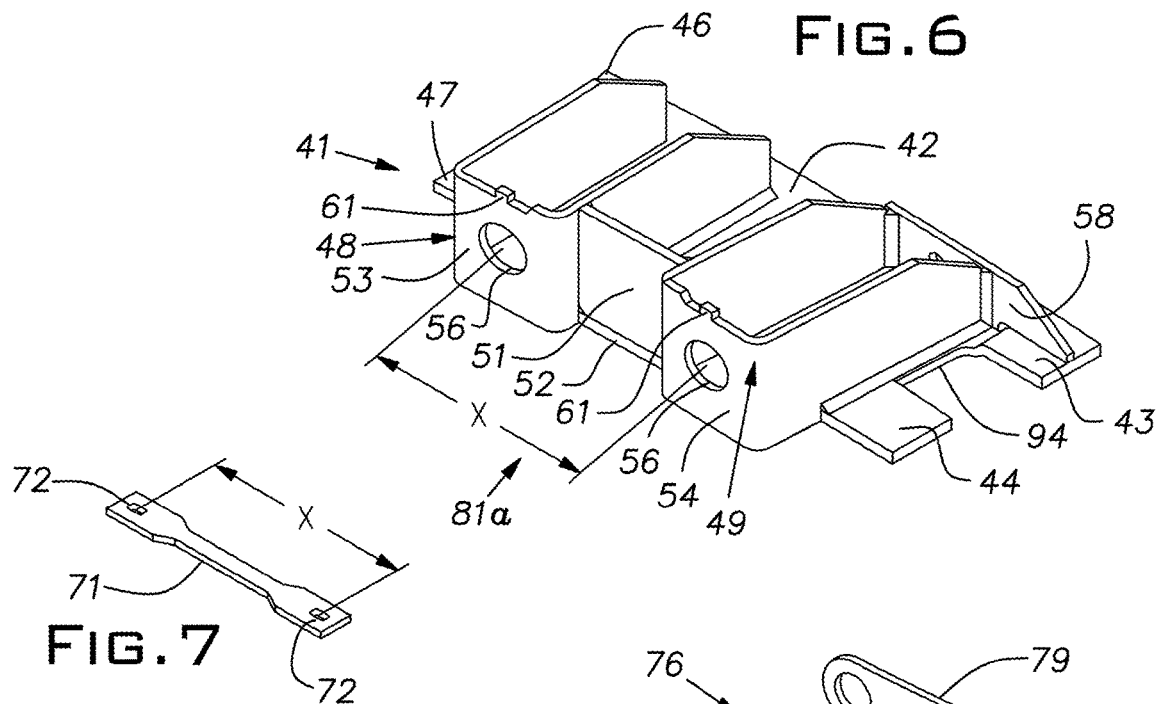
FIG. 6
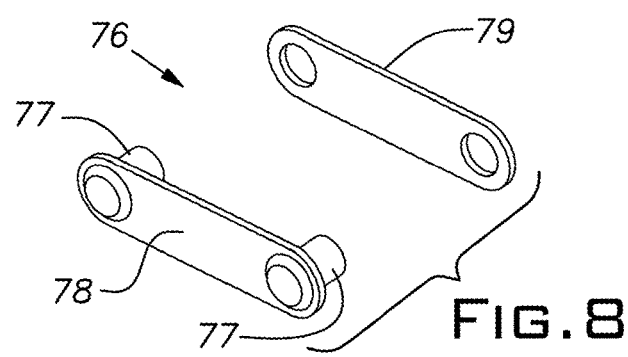
FIG. 7
FIG. 8
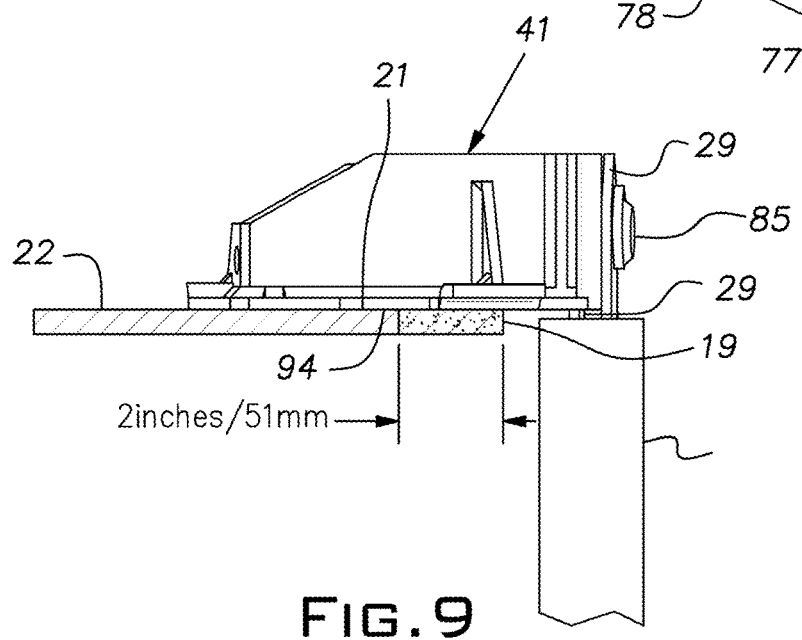
FIG. 9

THIMBLE FOR CYCLONE SEPARATOR

The present invention relates to a thimble assembly for a cyclone separator particularly useful in high temperature, corrosive atmospheres.

BACKGROUND OF THE INVENTION

Cyclone separators are used in different applications where solid particulates suspended in a gas phase are to be separated from the gas phase. A separator typically comprises a cyclone housing having an upper substantially cylindrical part with an upwardly extending circular discharge for the gas phase, a lower conical part having an outlet at its narrow bottom for discharging particulate matter, a tangential inlet in the upper part for introducing the suspension which is to be separated, and a central circular structure called a thimble depending from a shelf at an upper wall of the housing. The thimble (which can also be referred to as a central tube, a vortex finder or a dip tube) is adjacent the outlet and extends from the shelf axially in the cyclone housing to a distal free open end. The thimble forces the incoming suspension to rotate around the outside of the cyclone creating rotation and a vortex in the center of the cyclone allowing gas to exit upwardly through the discharge duct and obstructs particulate matter from exiting upwardly so that the particulate matter exits through the outlet at the bottom of the conical part.

U.S. Pat. Nos. 4,505,051 and 7,841,477 describe cyclone separators; the contents of these patents and the contents of the patents cited in these patents are incorporated herein by reference.

Cyclone separators such as used in cement making plants operate at very high temperature, approaching 1000 degrees C. for example, and are exposed to corrosive materials. These harsh environments can degrade the thimble to a condition requiring its replacement long before the end of the working life of the cyclone separator.

Replacement of a thimble has been an expensive proposition in part because a new premium thimble will typically be custom built for a specific installation. Experienced suppliers, to reduce costly manufacturing mistakes, will often visit the prospective site of a repair or upgrade to closely verify the geometry of the separator to assure that the replacement thimble to be manufactured will fit the separator unit when it is delivered. This field study adds to basic costs and extends the delivery time of a replacement thimble.

Heretofore, premium replacement thimbles have been custom built, often on a rush basis, after a failure or the detection of an insipient failure. The aftermarket industry has generally not found it practical to build and inventory complete thimble units because of the variety of separator sizes in installed plants.

Cyclone separators operating at high temperature and subjected to corrosive materials have been susceptible to early thimble degradation in part, because of relatively large exposed metal areas. Prior thimble designs have been relatively expensive to manufacture, for example, because segments making up the circular thimbles were made with arcuate shapes that complicated their tooling, molding, and assembly.

SUMMARY OF THE INVENTION

The invention provides a thimble assembly for a cyclone separator that, using common parts, can be installed on cyclone units of a wide size range. The inventive technology allows a manufacturer to produce thimble parts with an economy of scale and to inventory the parts prior to receiving an order for a particular installation. The technology effectively eliminates lead times, is flexible enough to eliminate the need to confirm the size of the required unit by dispatching an agent of the manufacturer to the perspective installation site and eliminates engineering time to design custom parts.

Segments used to construct the inventive thimble are less expensive to manufacture and are longer lasting than prior art parts. The foregoing improvements and advantages as well as others will become apparent from the following description of the invention.

BRIEF DESCRIPTION OF THE DRAWINGS

FIG. 3 is a perspective view of a top row segment of the inventive thimble;

FIG. 3A is an elevational view of the top row segment of FIG. 3 with a right hand part of a refractory covering removed;

FIG. 3B is a cross-sectional view of the top row segment taken in a plane indicated at 3B-3B in FIG. 3A;

FIG. 3C is a top view of the top segment as modified in FIG. 3A;

FIG. 4 is a perspective view of a middle row segment of the inventive thimble;

FIG. 4A is an elevational view of the middle row segment of FIG. 4 with a right hand part of a refractory covering removed;

FIG. 4B is a cross-sectional view of the middle row segment taken in a plane indicated at 4B-4B in FIG. 4A;

FIG. 4C is a top view of the middle segment as modified in FIG. 4A;

FIG. 5 is a perspective view of a bottom row segment of the inventive thimble;

FIG. 5A is an elevational view of the bottom row segment of FIG. 5 with a right hand part of a refractory covering removed;

FIG. 5B is a cross-sectional view of the bottom row segment taken in a plane indicated at 5B-5B in FIG. 5A;

FIG. 5C is a top view of the bottom row segment as modified in FIG. 5A;

FIG. 6 is a perspective view of a segment mounting bracket;

FIG. 7 is a perspective view of a placement link;

FIG. 8 is a perspective view of a bottom row segment link assembly;

FIG. 9 is a somewhat diagrammatic view of an installed mounting bracket and part of a top row segment suspended by the mounting bracket;

DESCRIPTION OF PREFERRED EMBODIMENTS OF THE INVENTION

As used herein, when a range such as 5 to 25 (or 5-25) is given, this means preferably at least 5, and separately and independently, preferably not more than 25.

Figure 1:
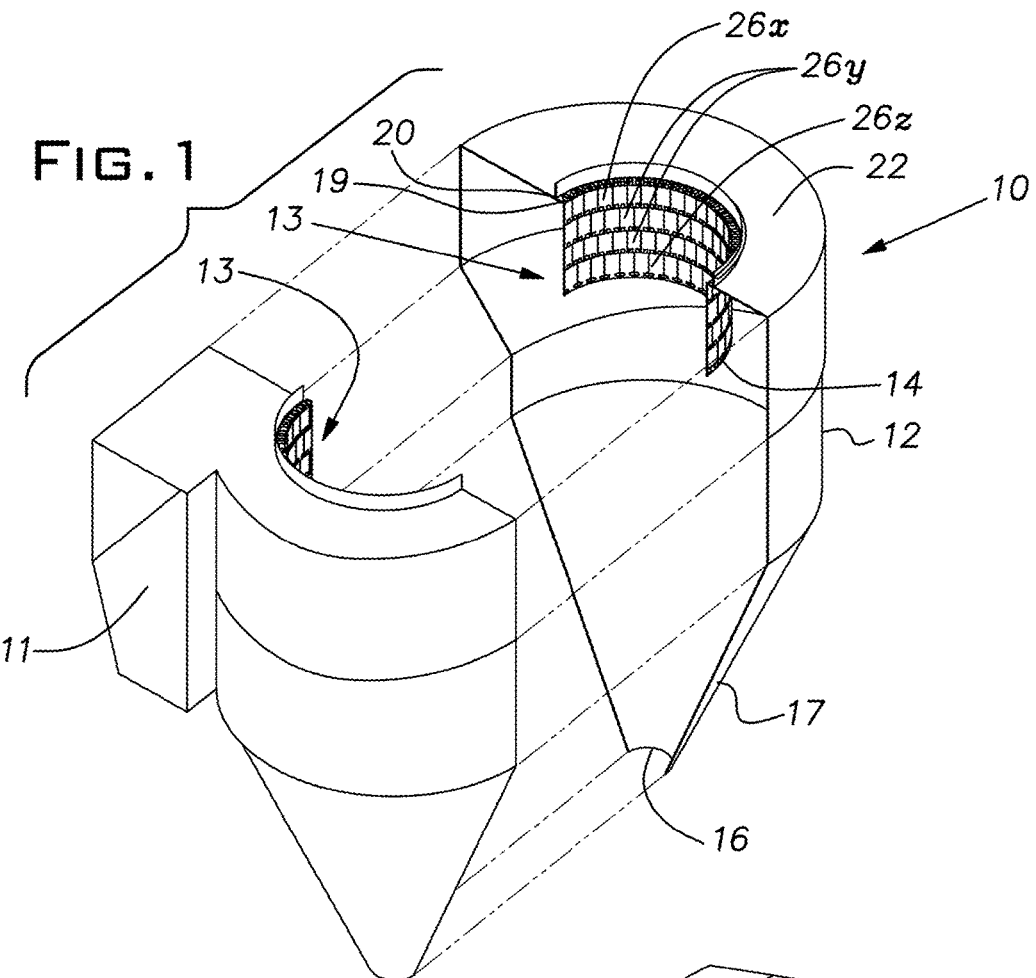
FIG. 1 is an exploded perspective view of a cyclone separator showing the thimble of the invention.

FIG. 1 illustrates a cyclone separator 10 of a type that is used, for example, in a lower hot stage of a cement manufacturing plant. A mixed phase of gases and solid particulate matter enters an inlet 11 of a housing 12. In the housing 12, the mixture swirls around a central thimble or thimble assembly 13. Gases enter a lower open end 14 of the thimble 13, pass vertically upwardly through the interior of the thimble and exit the housing 12. Particulate matter descends in the housing 12 and exits through an outlet 16 in a conical bottom part 17 of the housing 12.

The thimble assembly 13 is concentric with a perimeter of an exhaust opening 19 defining an inside diameter bounded by a shelf 21 formed by an upper wall 22 of the housing 12.

The shelf opening diameter of existing cyclone separators of the type under consideration here is generally in the range of 3 to 5 meters and is preferably circular. The thimble assembly 13, preferably circular, will have a nominal diameter corresponding to (technically smaller than) the diameter of the exhaust opening 19 (preferably circular) formed by the shelf 21. It is customary to construct a thimble of loosely joined segments organized in axially draped circumferential rows.

In the illustrated thimble construction, all of the segments 26 of a particular row are identical and the segments of one row are different from another row, although the middle two rows have identical segments. Various segments 26$x$, 26$y$ and 26$z$ are shown in FIGS. 3, 4 and 5, respectively. Herein, when a number designation has no suffix letter x, y or z, the designation is intended to mean any one of the segments 26. This convention will be used with certain other elements of the segments 26. All of the segments 26 have a steel plate core 27$x$, 27$y$ and 27$z$ encased in a refractory 28$x$, 28$y$ and 28$z$. The segments 26 are plate-like, being longer than they are wide. Each segment 26 has two pairs of tabs 29 projecting from an upper edge or face of the refractory 28. Pairs of the tabs 29 have aligned 1 1/16 inch holes 31 allowing the tab pairs to serve as a clevis 80 with a spacing 86 between the pair of tabs 29. The upper segments 26$x$ (FIGS. 3, 3A-C) and the middle segments 26$y$ (FIGS. 4, 4A-C) have plate areas with 1 1/16 inch holes or edge area holes 32 that are adapted to be received in the devises formed by tabs 29 of an underlying segment 26. The plate cores 27 are rectangular steel plates of, for example, 3/16 inch thickness, 21 5/16 inch length and 8 15/16 inch width. The plate cores 27 are bent on a longitudinal center line so that half of the core plate is in a plane (82) 4.5 degrees from the plane 82 of the other half. The clevis tabs 29, made of 3/16 inch steel plate, are welded flat against opposite sides of a respective plate core 27 so that each tab pair diverges at the 4.5 degree angle from the other pair. A cantilevered upper part of a tab 29 is offset away from the opposite tab to provide a space of 7/16 inch, for example, there between.

Top edges of all of the plate cores 27 and bottom edges of the top and middle plate cores 27$x$, 27$y$ are notched in a central zone thereby saving weight of material that would otherwise be unstressed and, therefore, a non-functional area.

The plate cores 27 including their ends are encased in the refractory 28 except for pockets 36 in an edge area 83 of the steel core, that receive clevis tabs 29 of the middle or bottom segments 26$y$, 26$z$ or pockets 37 on the bottom segments 26$z$ that receive link assemblies described below. The pockets 36 have a reverse taper 84 or undercut of, for example, 20 degrees.

FIGS. 3C, 4C and 5C show that the steel plate cores 27 are oriented so that an imaginary chord-like line between their respective longitudinal edges is parallel to opposite main faces 38$x$, 38$y$, 38$z$ and 39$x$, 39$y$ and 39$z$ of their respective refractory 28$x$, 28$y$ and 28$z$. The main faces or sides 38, 39 of each refractory 28 are parallel while narrow vertical sides or edge faces 40$x$, 40$xa$, 40$y$ and 40$z$ of each refractory 28$x$, 28$y$ and 28$z$ symmetrically diverge from one another at a shallow angle of, for example 9 degrees. Refractory with flat main faces is more efficient to production cast than prior art refractory with curved faces. By way of example, the refractories 28 can be 21 5/8 inch long, 12 1/16 inch wide at the major or main face 39 and 1 15/16 inch thick (the exception being the bottom row segment 26$z$ having a refractory length of 23 5/8 inch). The minor main face 38 of a segment 26 when assembled in a thimble 13 faces the thimble interior.

The steel plate core 27$x$ of the upper segments 26$x$ has a pair of oval circular anchors 30 welded perpendicular to the planes of the core at the top and bottom notched central zone 33, 34. The anchors 30 can be the drops or slugs from punching 1 1/16 inch slots in brackets described below. The upper and lower cross hatched areas on the plate core 27$x$, depicted in FIG. 3A can be protected with a rubberized coating and the inner cross hatched area can be covered with an adhesion promoting coating.

The steel plate core 27$y$ of the second and third middle row segments 26$y$ and the steel plate core 27$z$ of the bottom row segments 26$z$ have D-shaped holes 45 punched in their mid-sections. Anchor discs 35, made from 1 1/16 inch hole drops are welded in the D-shaped holes 45 perpendicular to and centered across the plane of the plate cores 27$y$, 27$z$. The cross hatched area of the plate core 27$y$ and anchors 35 shown cross hatched in FIG. 4A can be coated with a rubberized coating.

The bottom row segment plate core 27$z$ is distinguished from the top and middle plate cores 27$x$ and 27$y$ by having its lower pin holes 32 with a greater center-to-center distance so that they are closer to the longitudinal edges of the plate core 27$z$.

Figure 2:
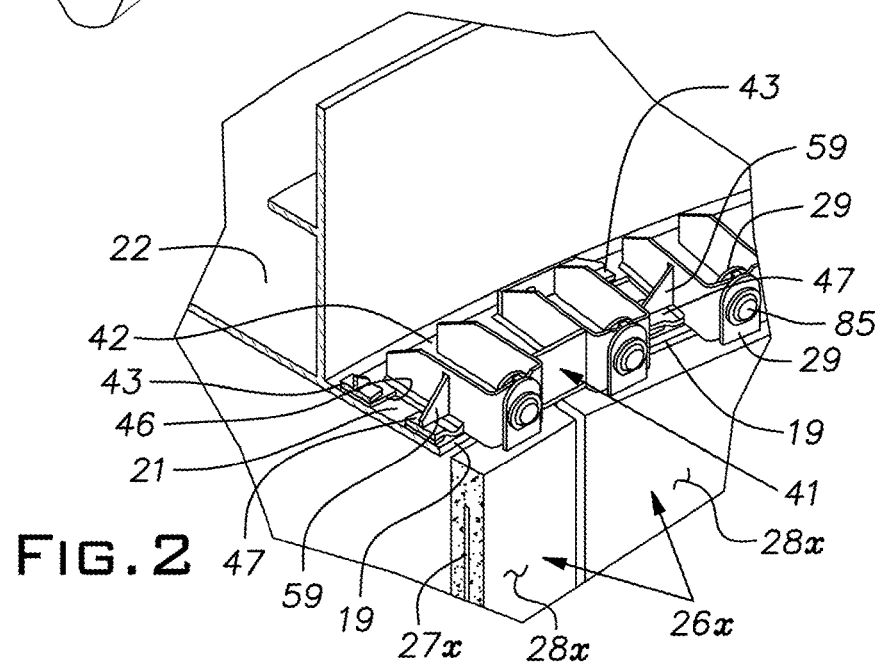
FIG. 2 is a fragmentary enlarged perspective view of a mounting area of the thimble.

FIG. 6 illustrates a mounting bracket 41 for suspending the thimble segments 26 by coupling with the top row of segments 26$x$. The bracket 41 is a weldment of shaped steel plates. A base 42 of the bracket can be made of 1/4 inch steel plate with the remaining bracket parts being made of 3/16 inch steel plate. The base 42 has a generally rectangular shape in plan view with a pair of tabs 43, 44 and 46, 47 at each end. A rear tab 43 on the right in FIGS. 6 and 2 is raised above a flat plane 94 of the base proper a distance corresponding to the thickness of the base plate 42. Similarly, a front tab 47 on the left in FIGS. 6 and 2 is raised above the base plane. Left and right hand U-shaped members 48, 49 are welded to opposite end areas of the base 42. A plate 51 welded flush with a front edge 52 of the base 42 is also welded to side legs of the members 48, 49 for reinforcement purposes. A center web 53, 54 of each of the members 48, 49 lies in a vertical plane and has a 1 1/16 inch wide oval hole 56. The stamped drops from the holes 56 can be used for the anchors 30 of the top segment plate cores 27x. The center webs 53, 54 are suspended a distance from the base plate front edge 52 a distance considerably greater than the thickness of the segment tabs 29. The planes of the center webs 53, 54 are out of parallelism by a small angle 81, 81a of 4.5 degrees, the same angle as the divergence of the pairs of segment tabs 29. In such a manner that they are symmetrical with a line perpendicular to the front edge 52 of the base 42. The oval holes 56 are centered, for example, at 6 3/16 inch so that they correspond with the spacing between pairs of tab holes 31 of a segment 26. Gusset plates 58, 59 (FIG. 2) reinforce the elevated tabs 43, 47. Upper edges of the webs 53, 54 are shaped to provide small upstanding tabs 61.

A thimble 13 is installed piecemeal circumferentially along the perimeter of the shelf opening 19. The brackets 41 are arranged around the shelf ID with the tabs 43-47 overlying or underlying the tabs of adjacent brackets. This process is assisted by use of placement links 71 illustrated in FIG. 7. A link 71 bridging each adjacent pair of brackets 41 has rectangular holes 72 that fit over the bracket tabs 61 of adjacent brackets to properly space the adjacent brackets. When all of the brackets 41 are properly positioned, the overlying and underlying tabs 43-47 can be welded together and the base 42 of the brackets can be welded on the shelf. Thereafter, the rows of segments 26 are suspended from the brackets 41. The upper segments 26x are individually raised with their tab 29 straddling the webs 53, 54 of adjacent brackets. When the tab holes 31 and bracket web holes 56 are aligned, a short steel pin 85 of, for example 1 inch diameter is installed in these holes. The pins 85 can have steel washers pre-welded on one end and be secured after the pins are in place by steel washers welded on the opposite end. For economy, the pin washers can be formed from material blanked out of the plate cores 27 to form the central notches at the top and bottom of the segments 26.

Successive rows of segments 26y, 26z are similarly installed by raising a segment so that its tabs 29 straddle exposed lower holes 32 in two adjacent segments of the preceding segment row. One inch pins, as just described, are installed in the aligned tab and segment core holes 31, 32. The segments 26z of the bottom row of segments are stabilized by coupling adjacent segments together with a link assembly 76 illustrated in FIG. 8. Steel pins 77, again 1 inch in diameter, are pre-welded to a steel link 78. The pre-welded pins 77 are inserted in lower holes 32 of adjacent plate cores 27z and another steel link 79 of the assembly 76 at opposite faces of the segments is installed and welded on the inserted pin ends.

Areas of the refractory 28 excluded from a segment 26 for clearance of the tabs 29 or link assembly 76 can be filled with refractory after the connecting pins are in place and the retainer washers and links 78 are welded on. The undercut or reverse taper of the clearance formations or pockets 36 assist in holding the filled in refractory.

In accordance with the invention, the number of mounting brackets 41 to be used is determined by the inside diameter of the shelf 18. Study has revealed that a large majority of existing cyclone separators of the type under consideration here have a nominal diameter between 3 meters and 5 meters. The geometry of the disclosed mounting bracket 41 and segments 26 is based on use of 4 meters as an average or mean of these diameter dimensions and with sufficient clearance in their joints to allow them to conform to 3 meter to 5 meter shelf inside diameters. The disclosed inventive brackets 41 are configured to be practically located radially in relation to a shelf edge 19 (FIG. 9) in a range of 2 inches (51 mm.). This allows the brackets 41 to cover any shelf inside diameter (ID) in the 3 meter to 5 meter range since the addition or removal of one bracket 41 (and the corresponding addition or removal of one staggered column of segments 26) will change the diameter nominally by 4 inches. This relationship comes from the essential equality of the arc length and the effective chord length of a bracket 41 or segment 26, on a circle at a shelf ID spanned by a bracket or a segment. This arcuate/chordal span or length is the center to center spacing of adjacent brackets 41 or segments 26, 12 3/8 inches, which is twice the center to center distance of the bracket holes 56, 6 3/16 inches. A change in circumference of 12 3/8 inches effects a change in diameter of 4 inches (12 3/8÷π) or a radius change at the shelf ID of 2 inches. Preferably the thimble assembly has at least three times as many segments as mounting brackets.

For the bracket 41 to have adequate footing on the shelf 21, the bracket should have a radial width more than twice the difference between a minimum and a maximum shelf ID, this difference in the illustrated case is 2 inches shown in FIG. 9. As a rule, based on the foregoing, the base should preferably have a radial width dimension that is at least 1/3 the effective chord length of the bracket.

Clearance of the 1 inch diameter pins in the 1 1/16 inch holes and the 7/16 inch gap between pairs of tabs 29 receiving 3/16 inch plate core material, assures that the parts can be easily field assembled regardless of the shelf ID and corresponding number of brackets 41 and segments 26 being used.

Alternative Embodiment

In many cases an alternative segment is needed which is more resistant to attack and corrosion from gases and fluids, such as ammonia, in the operation of the cyclone separator. This alternative segment(s) will now be described. Unless otherwise stated, these alternative segments are the same as or substantially the same as, and are installed and used the same as or substantially the same as, the segments described above and illustrated in FIGS. 3-5B.

Figure 11:
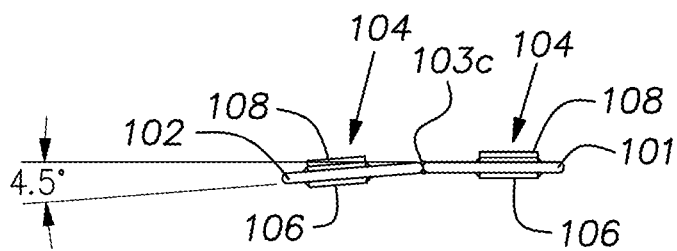
FIG. 11 is a top view of the reinforcing frame, with tabs, taken along line 11-11 of FIG. 10.
Figure 10:
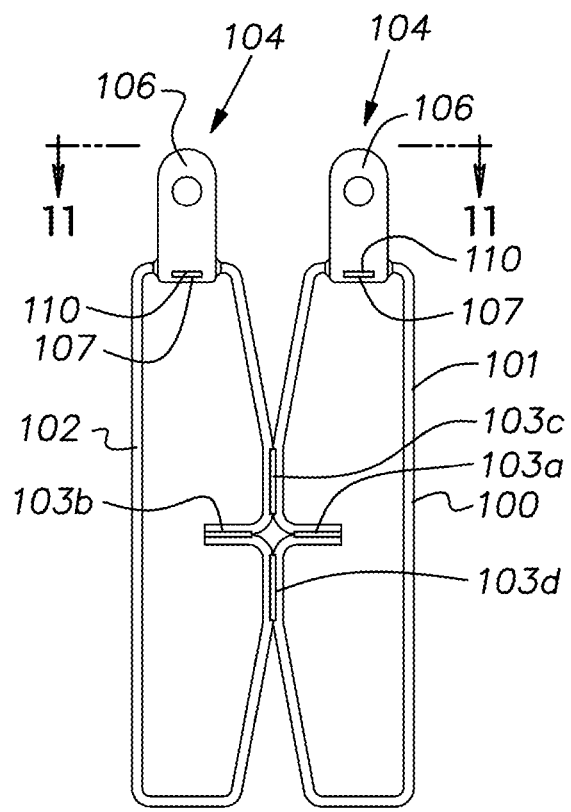
FIG. 10 is a front elevational view of a reinforcing frame, with tabs, for a segment.
Figure 12:
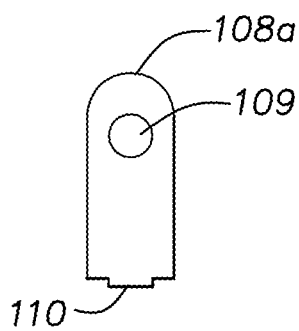
FIG. 12 is a front elevational view of a blank for forming a back tab.
Figure 12A:
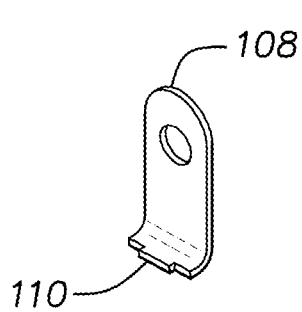
FIG. 12A is a perspective view of a back tab after it has been formed.
Figure 13:
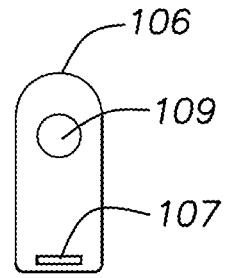
FIG. 13 is a front elevational view of a front tab.
Figure 17:
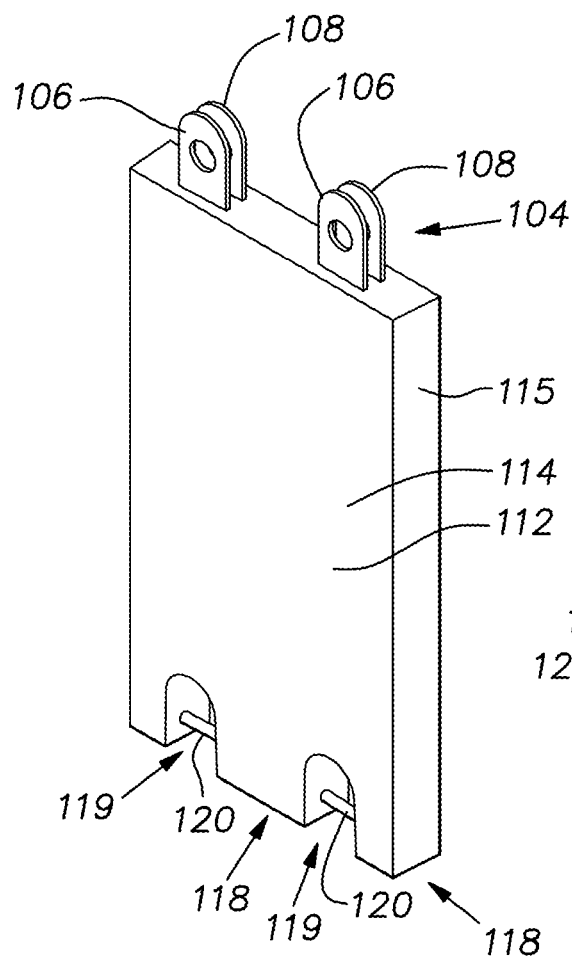
FIG. 17 is a perspective view of the segment of FIG. 14.

With reference to FIG. 10, there is shown a reinforcing frame 100. This reinforcing frame 100 basically takes the place of the steel plate cores 27, 27x, 27y and 27z of FIGS. 3-5B. Reinforcing frame 100 is preferably formed of a first bent rod 101 and a second bent rod 102. Each bent rod 101, 102 is formed by taking a piece of metal rod or metal round rod and bending it (all in the same plane) into the shape shown. The two ends of the first bent rod 101 are welded together at first weld 103a; in a similar manner, the two ends of the second bent rod 102 are welded together at weld 103b; each resulting bent rod substantially defines a plane. Then the first and second bent rods 101, 102 are coupled or joined together, preferably they are welded together at welds 103c and 103d. The bent rods can less preferably be bent into different configurations. With reference to FIGS. 10, 11, 17, at the top of each bent rod there is provided a pair of tabs 104. Each pair of tabs 104 consists of a front tab 106 and a back tab 108. With reference to FIG. 13, the front tab 106 is made from a flat piece of metal, preferably Inconel, having a hole 109 and an opening or slot 107. FIG. 12 shows a flat metal blank 108a, preferably Inconel, having an opening 109 and an extending tooth 110. The bottom of the blank 108a is then curved or bent at a right angle to form the curved back tab 108 shown in FIG. 12A. The front tabs 106 and back tabs 108 are then placed at the top of the reinforcing frame 100 as shown in FIG. 10; the tooth 110 is inserted into the opening or slot 107 as shown and then the tabs 106, 108 are welded into place at the tops of the reinforcing frame 100 as shown in FIGS. 10 and 11.

With reference to FIG. 11, each pair of tabs 104, consisting of front tab 106 and back tab 108, are illustrated. As shown, each of first bent rod 101 and second bent rod 102 defines a plane. With reference to FIG. 11, please note that the first bent rod 101 (which is planar) is not in the same plane as the second bent rod 102 (which is planar); rather, the reinforcing frame 100 is bent in the middle to define an angle (in other words, the planes defined by the first bent rod and the second bent rod define an angle) preferably about 4.5 degrees as shown in FIG. 11; less preferably about 4-5 or 3.5-5.5 or 3-6 or 2-7 degrees.

Figure 15:
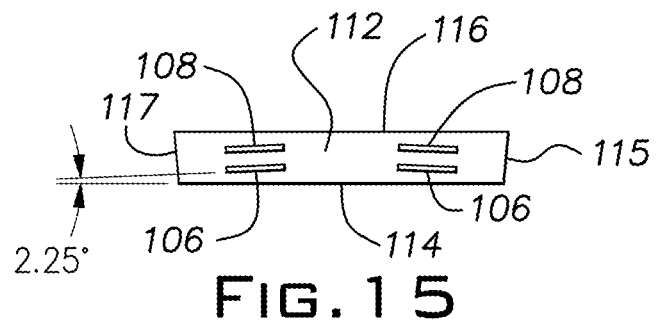
FIG. 15 is a top view of the segment taken along line 15-15 of FIG. 14.
Figure 14:
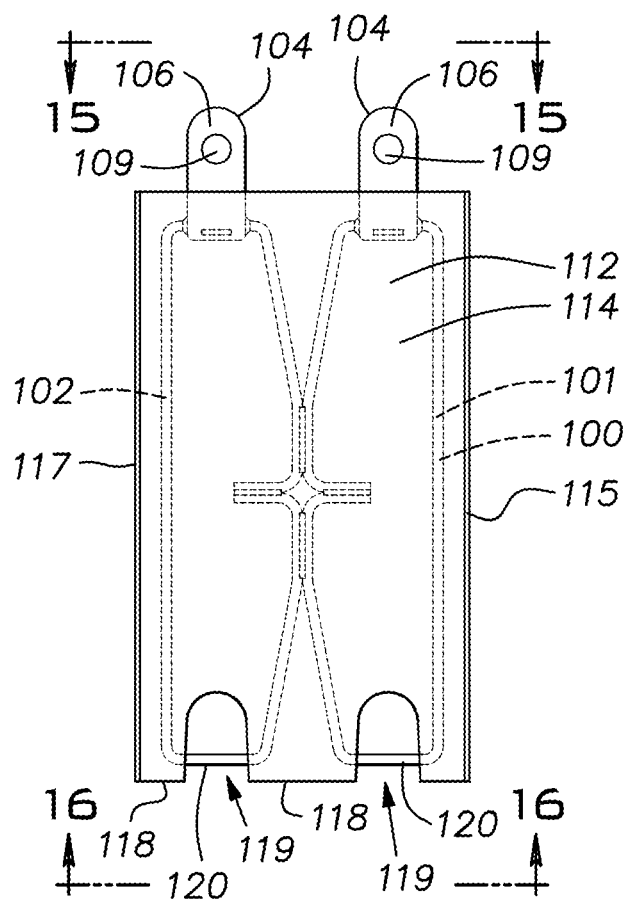
FIG. 14 is a front elevational view of a segment, for the top and middle rows, showing in broken lines the reinforcing frame embedded therein.
Figure 16:
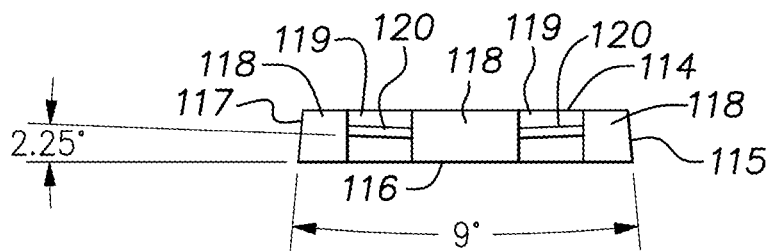
FIG. 16 is a bottom view of the segment taken along line 16-16 of FIG. 14.

With reference to FIG. 14, the reinforcing frame 100, with tabs attached, is embedded in the middle of the segment 112 in the same way that the steel plate cores 27x, 27y described above are located in the middle of the segments 26x, 26y. With reference to FIG. 14, there is shown a segment 112 which is preferably used in the top and middle rows of the thimble assembly. The dimensions of segment 112 are preferably the same as the dimensions of segments 26x, 26y. With reference to FIGS. 14-16, segment 112 has a front face 114, a back face 116, a first side 115, a second side 117 and two tab pairs 104 at the top. As shown in FIG. 15, the tabs 106, 106 and 108, 108 are angled or tilted with respect to each other the same as in FIG. 11.

With reference to FIGS. 14, 16 and 17, at the bottom 118 of the segment 112 are a pair of pockets 119 where there is no refractory material. The absence of the refractory material exposes, in each pocket 119, an exposed segment 120 of bent rod. These pockets 119 and exposed segments 120 are provided so that lower segments can be hung from an upper segment 112 as described previously. FIG. 16 shows the two exposed segments 120, 120 being angled with respect to each other the same as tabs 106, 106 are angled with respect to each other in FIG. 15.

With reference to FIG. 16, it can be seen that the first side 115 angles inwardly 4.5 degrees as it extends from the back face 116 to the front face 114. Second side 117 angles inwardly the same amount as first side 115 so that they total 9 degrees. Less preferably, each side 115, 117 angles inwardly about 4-5 or 3.5-5.5 or 3-6 or 2-8 degrees, so that the plane defined by first side 115 intersects the plane defined by second side 117 to define an angle between them of about 9, 8-10, 7-11, 6-12 or 4-16, degrees.

Figure 18:
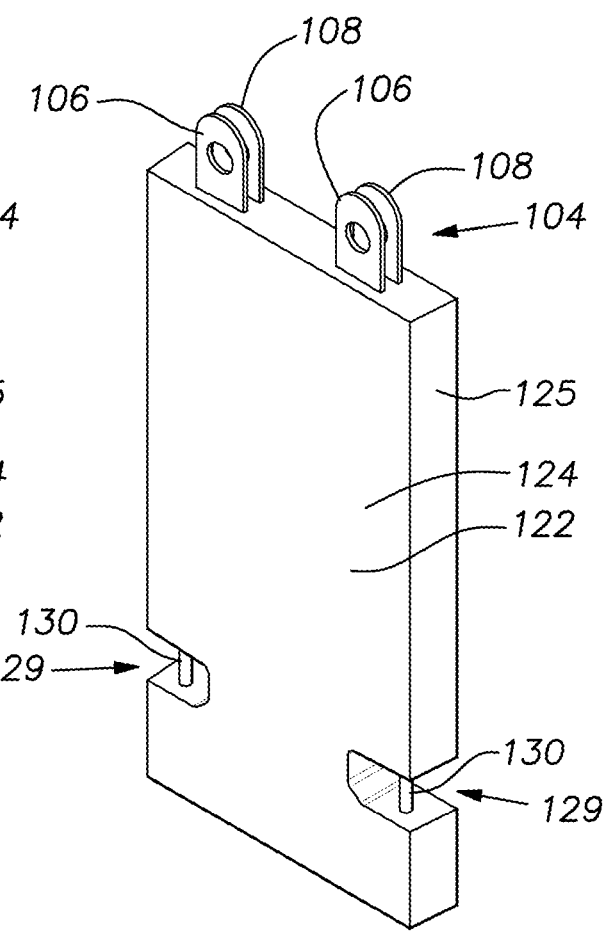
FIG. 18 is a perspective view of a segment, for the bottom row.
Figure 19:
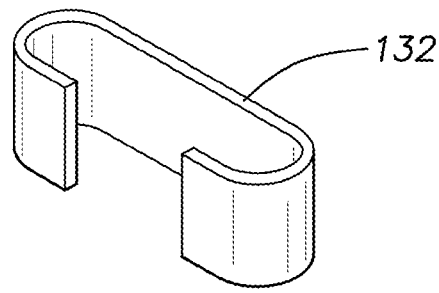
FIG. 19 is a perspective view of a link to connect bottom row segments.

With reference to FIG. 18, there is shown a segment 122, preferably for the bottom row. Segment 122 has a front face 124, a first side 125 and two pairs of tabs 104 at the top. The dimensions of segment 122 are preferably the same as the dimensions of segment 26z and are similar to or correspond to the dimensions of segment 112. Similar to the pockets 119 and exposed segments 120 of FIG. 17, segment 122 has a pair of pockets 129 on the sides of the segment 122. Each pocket 129 exposes an exposed segment 130 of bent rod. When the bottom row of the thimble assembly is assembled with a plurality of segments 122, adjacent segments 122 are connected together by taking a link 132 as shown in FIG. 19 and using it to wrap around and connect a pair of exposed segments 130 in adjacent segments 122. Except as noted, segment 122 is preferably the same as segment 112.

The reinforcing frame 100, including first bent rod 101 and second bent rod 102, are preferably a round rod about ⅜ inch in diameter, less preferably ¼-½ inch in diameter. Each of the first bent rod and the second bent rod is preferably 50-55 inches long, less preferably 45-65 or 40-70 or 35-75 or 30-80 inches long. If the segments 112, 122 are larger or smaller than described above, the reinforcing frame 110 is preferably larger or smaller in a proportional manner. The front tab 106 and back tab 108 are preferably 3/16 inches, less preferably ⅛-¼ inch thick metal. The bent rods and tabs are preferably corrosion resistant metal, preferably nickel-chromium alloy, preferably predominantly nickel with chromium as the second element in the alloy by weight; more preferably nickel-chromium-iron alloy, preferably 45-70 or 55-65 or 58-63% nickel and preferably 14-31 or 19-27 or 21-25% chromium, and preferably 6-20 or 10-20 or 12-18 or 14-16% iron, preferably Inconel, more preferably Inconel 601.

It should be evident that this disclosure is by way of example and that various changes may be made by adding, modifying or eliminating details without departing from the fair scope of the teaching contained in this disclosure. For example, the dimensions referenced in this disclosure are only exemplary and may be varied to suit the circumstances. It is expected that a thimble can be constructed of only three rows of segments or more than four rows of segments. The invention is therefore not limited to particular details of this disclosure except to the extent that the following claims are necessarily so limited.

What is claimed is:

1. A cyclone separator comprising a housing and a thimble assembly, the thimble assembly being installed along a perimeter of an exhaust opening of the housing, the thimble assembly comprising a plurality of mounting brackets and a plurality of segments, the plurality of segments being of a number at least three times the number of mounting brackets, each segment having a reinforcing frame encased in a refractory, the reinforcing frame being made of metal rod, the metal rod being nickel-chromium alloy, wherein each of the segments defines a first pocket and a second pocket, a first exposed segment of metal rod being located in the first pocket, a second exposed segment of metal rod being located in the second pocket.

2. The cyclone separator according to claim 1, wherein the metal rod is about ¼ to ½ inch in diameter.

3. The cyclone separator according to claim 1, wherein the metal rod is about ⅜ inch in diameter.

4. The cyclone separator according to claim 1, wherein the metal rod is nickel-chromium-iron alloy.

5. The cyclone separator according to claim 1, wherein the reinforcing frame comprises at least 70 inches of the metal rod.

6. The cyclone separator according to claim 1, wherein the metal rod of the reinforcing frame comprises a first bent rod and a second bent rod, said first and second bent rods being coupled together, wherein each of said first and second bent rods is at least 35 inches long.

7. The cyclone separator according to claim 1, wherein the metal rod of the reinforcing frame comprises a first bent rod and a second bent rod; the first bent rod defining a first plane, the second bent rod defining a second plane, the first plane and the second plane defining an angle of about 2-7 degrees between themselves.

8. The cyclone separator according to claim 1, each of the segments having a front face, a back face, a first side and an opposite second side, the first side defining a first plane, the second side defining a second plane, the first plane intersecting the second plane to define an angle between them of about 4-16 degrees.

9. The cyclone separator according to claim 1, wherein the segments comprise a first sub-set of segments, each segment of said first sub-set of segments having a first side, a second side, and a bottom, wherein the first pocket and the second pocket are located on the bottom.

10. The cyclone separator according to claim 1, wherein the segments comprise a first sub-set of segments, each segment of said first sub-set of segments having a first side, a second side, and a bottom, wherein the first pocket is located on the first side and the second pocket is located on the second side.

11. The cyclone separator according to claim 10, wherein an exposed segment of metal rod of a first segment of said first sub-set of segments is connected to an exposed segment of metal rod of an adjacent segment of said first sub-set of segments by a link.

12. A cyclone separator comprising a housing and a thimble assembly, the thimble assembly being installed along a perimeter of an exhaust opening of the housing, the thimble assembly comprising a plurality of mounting brackets and a plurality of segments, the plurality of segments being of a number at least three times the number of mounting brackets, each segment having a reinforcing frame encased in a refractory, the reinforcing frame being made of metal rod, the metal rod being nickel-chromium alloy, wherein the metal rod of the reinforcing frame comprises a first bent rod and a second bent rod; the first bent rod defining a first plane, the second bent rod defining a second plane, the first plane and the second plane defining an angle of about 2-7 degrees between themselves.

13. The cyclone separator according to claim 12, wherein the metal rod is about ¼ to ½ inch in diameter.

14. The cyclone separator according to claim 12, wherein the metal rod is about ⅜ inch in diameter.

15. The cyclone separator according to claim 12, wherein the metal rod is nickel-chromium-iron alloy.

16. The cyclone separator according to claim 12, wherein the reinforcing frame comprises at least 70 inches of the metal rod.

17. The cyclone separator according to claim 12, wherein the metal rod of the reinforcing frame comprises a first bent rod and a second bent rod, said first and second bent rods being coupled together, wherein each of said first and second bent rods is at least 35 inches long.

18. The cyclone separator according to claim 12, each of the segments having a front face, a back face, a first side and an opposite second side, the first side defining a first plane, the second side defining a second plane, the first plane intersecting the second plane to define an angle between them of about 4-16 degrees.

19. The cyclone separator according to claim 12, wherein the segments comprise a first sub-set of segments, each segment of said first sub-set of segments having a first side, a second side, and a bottom, wherein the first pocket and the second pocket are located on the bottom.

20. The cyclone separator according to claim 12, wherein the segments comprise a first sub-set of segments, each segment of said first sub-set of segments having a first side, a second side, and a bottom, wherein the first pocket is located on the first side and the second pocket is located on the second side.

21. The cyclone separator according to claim 20, wherein an exposed segment of metal rod of a first segment of said first sub-set of segments is connected to an exposed segment of metal rod of an adjacent segment of said first sub-set of segments by a link.

* * * * *